Aug. 24, 1954 — M. O. ENGSETH — 2,687,097
GREASE GUN
Filed April 19, 1950 — 2 Sheets-Sheet 1

INVENTOR
MARTIN O. ENGSETH
ATTORNEYS

Aug. 24, 1954     M. O. ENGSETH     2,687,097
GREASE GUN
Filed April 19, 1950     2 Sheets-Sheet 2
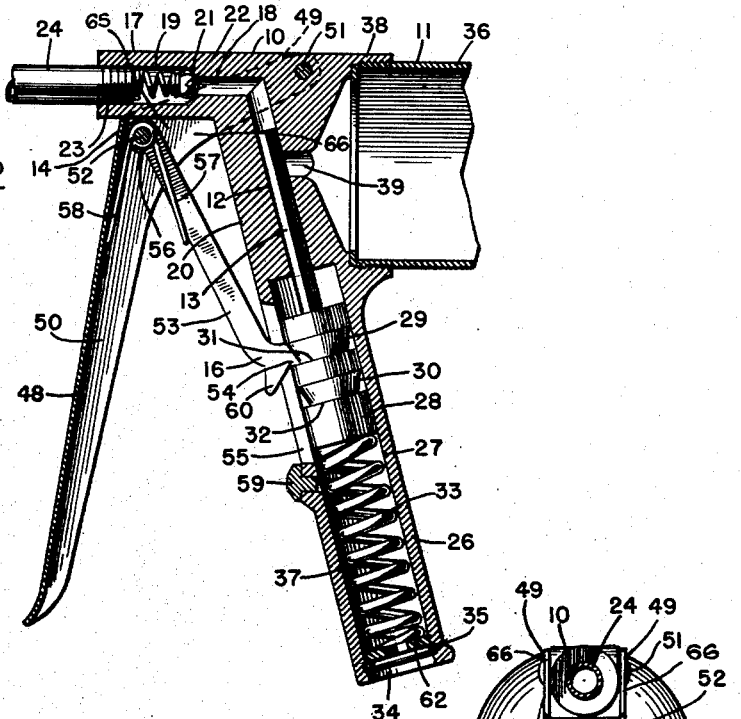
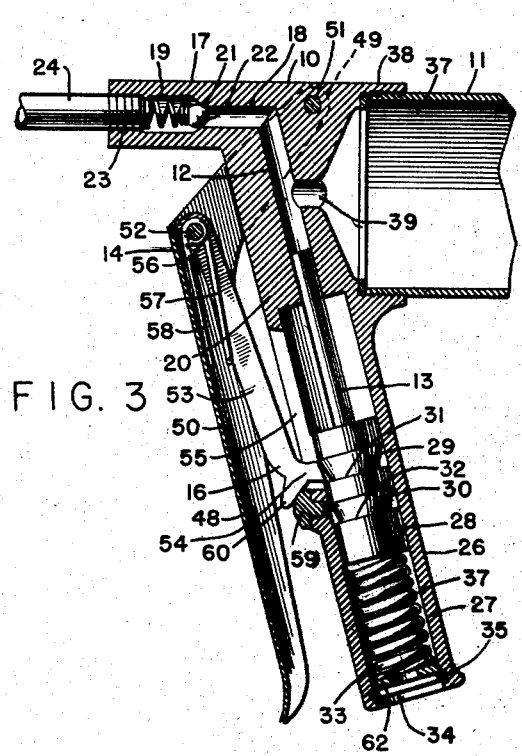
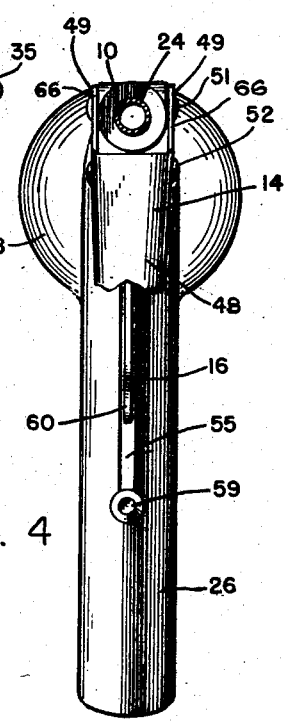
INVENTOR
MARTIN O. ENGSETH
ATTORNEYS Patented Aug. 24, 1954

2,687,097

UNITED STATES PATENT OFFICE 2,687,097

GREASE GUN

Martin O. Engseth, Wayzata, Minn.

Application April 19, 1950, Serial No. 156,830

4 Claims. (Cl. 103—153)

My invention relates to grease guns and has for an object to provide a grease gun by means of which exceedingly high pressure can be procured.

Another object of the invention resides in providing a grease gun having a piston controlled by a lever and operable upon manipulation of said lever a second time to increase the pressure obtainable by the first manipulation of the lever.

A still further object of the invention resides in providing a spring for procuring movement of the piston and in further providing a catch for engagement with a shoulder formed on a part movable with said piston to cock the piston against the action of said spring and releasing said part upon its arrival at the end of its path of motion.

Another object of the invention resides in providing a second shoulder on said part adapted to be engaged by said catch in the event that the piston does reach the end of its stroke and by means of which the spring may be further compressed to increase the force on the spring and the pressure produced by said piston.

Other objects of the invention reside in the novel combination and arrangement of parts and in the details of construction hereinafter illustrated and/or described.

In the drawings has been illustrated a grease gun provided with a body having a cylinder and with a discharge passageway leading to a suitable fitting. The said cylinder communicates intermediate its ends with a receptacle for grease detachably mounted thereon. In alignment with the cylinder is a bore in which a plunger connected to the piston and actuated by a spring in said bore operates to force said piston along said cylinder and to discharge the lubricant therein outwardly through said discharge passageway. This plunger is formed with two longitudinally spaced shoulders adapted to be engaged by a catch formed on the end of a reciprocating link. The said link is pivoted to a lever which in turn is pivoted to said body and which when operated serves to bring said catch into engagement with the outermost shoulder and to compress the spring and move the piston to the outermost end of said cylinder. A cam on said body engaging a cam follower on said link disengages the catch from said shoulder and releases the plunger to permit said spring to urge the piston along said cylinder. In the event that the joint to be lubricated is plugged up and the lubricant does not completely flow out of the cylinder, another operation of the lever causes said catch to engage the inner shoulder and to further compress the spring to procure additional force to direct the lubricant into the joint to be lubricated.

In the drawings:

Fig. 2 is a view similar to Fig. 1 of a portion of the structure shown therein and illustrating the arrangement of the piston when the same has been partially retracted and with the catch in engagement with another of the shoulders of the plunger.

Fig. 3 is a view similar to Fig. 2 showing the piston in fully retracted position and with the catch in engagement with the same shoulder as shown in Fig. 2.

Fig. 4 is an elevational cross sectional view taken substantially through the discharge nipple on line 4—4 of Fig. 1.

Figure 1:
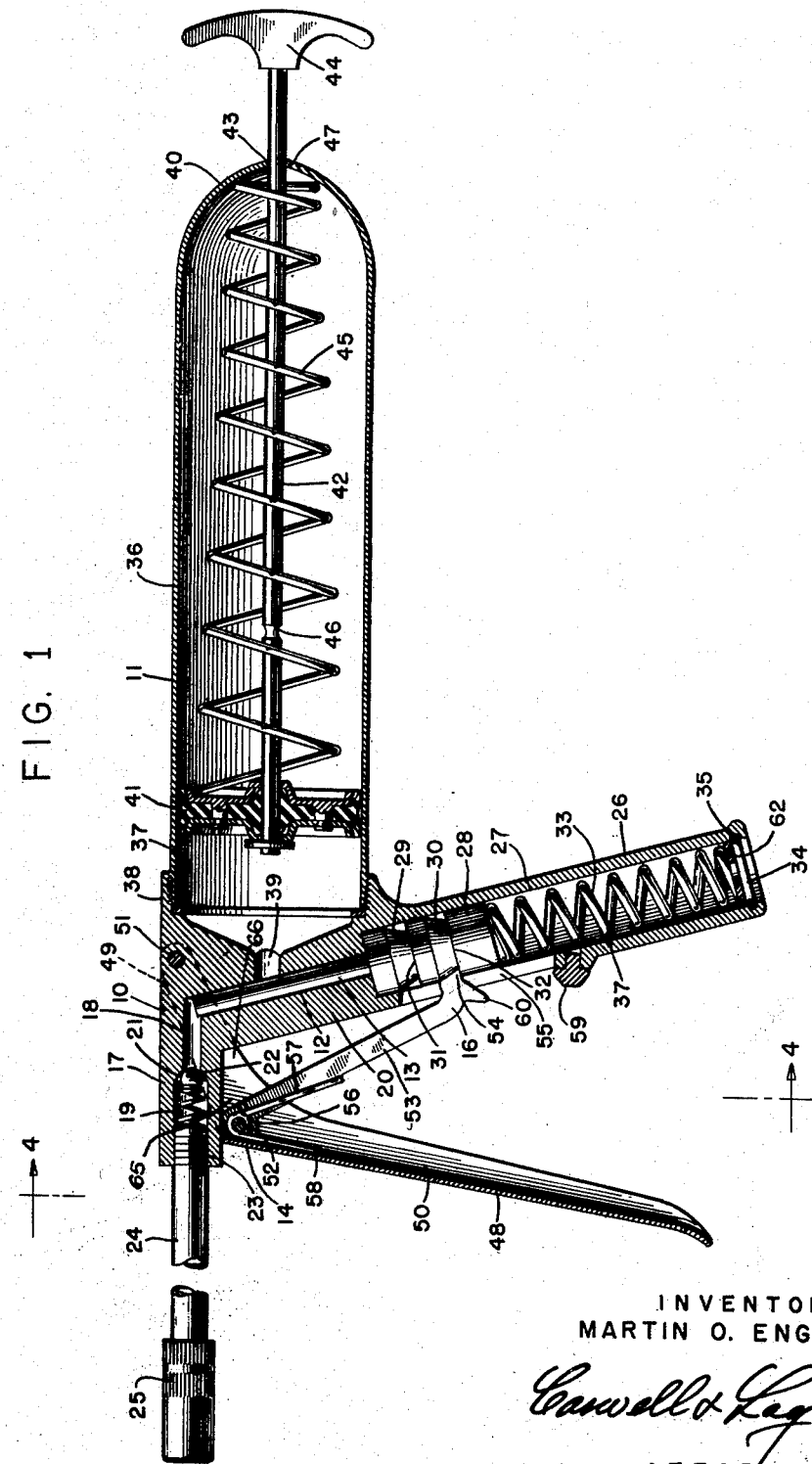
Fig. 1 is a longitudinal elevational sectional view of a grease gun illustrating an embodiment of the invention and showing the piston in extended position.

The invention disclosed comprises a body 10 in which the operating parts of the device are disposed. This body is constructed as a casting which is formed with an angular portion 20 extending outwardly therefrom. In this angular portion is a cylinder 12 in which is slidably mounted a piston 13. This piston is of rather small dimensions so that as said piston is forced along the cylinder suitable pressure can be procured within said cylinder. The body 10 has a tubular portion 17 which is formed with a bore 18 extending angularly with reference to the cylinder 12 and communicating therewith. This bore has an enlargement 19 forming a valve seat 21 at the inner end of said enlargement. A ball valve member 22 is disposed within this enlargement and is adapted to seat against the seat 21. The outer end of the bore 19 is formed with threads 23 into which is screwed a nipple 24 having mounted on its outer end a fitting 25. The fitting 25 is adapted to be connected to the part to be lubricated and inasmuch as the said fitting forms no particular feature of the invention, the same has not been shown in detail.

The angular portion 20 of the body 10 has a tubular extension 26 which is formed with a bore 27 concentric with the cylinder 12 and communicating therewith. This bore forms a guide in which is slidably mounted a plunger 28 and to which the piston 13 is attached. This plunger is formed with two grooves 29 and 30 which provide shoulders 31 and 32 on the plunger. A compression coil spring 33 is disposed within the bore 27 and engages at one end the outer end of the plunger 28 and at its other end a disc 62 which serves as a spring seat and rests on a retaining ring 34 received in a recess 35 in the end of the extension 26. By means of this construction the piston 13 is urged to travel along the cylinder 12 to force the lubricant entering said cylinder into the bore 18 and to discharge the same past the valve member 22 and into the nipple 24.

Attached to the body 10 is a receptacle 11 for the lubricant used with the grease gun. The receptacle 11 consists of a tube 36 having a cylindrical chamber 37 extending throughout the length thereof. One end of this tube is screwed into a threaded boss 38 formed as a part of the body 10. This boss has a passageway 39 therein which communicates with the cylinder 12 intermediate the length thereof and with the cylindrical chamber 37 in tube 36. The outer end of the tube 36 is flared inwardly as indicated at 40 to form a closure for the outer end of the tube. Slidably mounted within the chamber 37 is a piston 41 of any suitable construction and which is attached to a piston rod 42. The said rod extends through the closure 40 being slidably guided in a circular opening 43 in said closure and has attached to its outer end a handle 44 by means of which the piston may be manipulated. A compression coil spring 45 disposed within the chamber 37 bears against the piston 41 and against the closure 40 and tends to urge the piston for movement toward the body 10 of the grease gun and to force the lubricant within the chamber 37 ahead of the piston 41 through passageway 39 and into the cylinder 12.

The receptacle 11 may be filled with lubricant by removing the tube 36 from the boss 38 and inserting the open end of the tube 36 into the lubricant. Upon then drawing the piston 41 inwardly into the cylinder and against the action of the spring 45 the chamber 37 ahead of the piston may be filled with lubricant. To temporarily hold the charge of lubricant within the cylinder a shoulder 46 is formed on the piston rod 42 and which is adapted to engage a shoulder 47 formed on the closure 40. When the piston rod is moved laterally the tube 36 with its charge of lubricant is then screwed back into the boss 38 and upon disengagement of the shoulder 46 from the shoulder 47 the grease gun is ready to be used.

For operating the plunger 28 a retracting mechanism 14 is employed which consists of a lever 48 preferably constructed of sheet metal and which has two arms 49 and 50 formed with flanges 66 straddling the body 10 of the gun as best shown in Figs. 1 and 4. he entire lever is formed by stamping the parts from sheet metal and bending the same into a U-shaped form. A rivet 51 extends through the body 10 and also through the flanges 66 of arms 49 and serves to pivot the lever 48 for swinging movement from a position shown in Fig. 1 to that shown in Fig. 3. The arms 49 and 50 are arranged in angular relation and at the part 65 thereof at the vertex between the said arms is provided a rivet 52 which extends completely through the flanges 65. This rivet pivotally supports an actuator 53 and through which the rivet 52 extends. The said actuator has a catch 54 at the free end of the same which is adapted to enter a slot 55 in the wall of the extension 26 and to be received within either of the grooves 29 or 30 and to engage either of the shoulders 31 or 32. The actuator 53 is urged toward the plunger 28 by means of a torsion spring 56, one end 57 of which engages the said catch and the other end 58 of which engages the arm 48.

For releasing the piston 13 a cam 59 is employed which is mounted on the extension 26 of the body 10. This cam is adapted to engage a cam follower 60 on the end of the actuator 53. When the said catch reaches the cam 59 said cam engages the follower 60 and forcibly withdraws the catch 54 from engagement with the shoulders 31 or 32 and releases the plunger 28 and piston 13.

The method of using the invention is as follows: The chamber 37 is first filled with lubricant as previously described and the tube 36 screwed back into the boss 38. For the sake of clearness the lubricant has not been shown in the drawings. Upon moving the piston rod 42 into a concentric position with reference to the opening 43, the piston 41 is free to travel toward the body 10. Since the passageway 39 is normally filled with air, the piston 41 moves slightly and the shoulder 46 is moved inwardly and away from the shoulder 47. The piston 41 is now free to travel and to force the lubricant into the bore 12 of body 10 as the lubricant is consumed. When the plunger 28 is in normal position the same is disposed as shown in Fig. 1 and the catch 54 is disposed in the groove 30 in engagement with the shoulder 32. If now pressure is applied to the lever 48 the same is moved toward the position shown in Fig. 3. When the cam 59 is engaged by the cam follower 60 the catch 54 is withdrawn from the groove 30 and out of engagement with the shoulder 32 and the plunger 28 released. In such position the end of the piston 13 is below the opening 39 and piston 41 forces lubricant into the portion of the bore 12 ahead of said piston. Upon release of the plunger 28 spring 33 forces the piston 13 along the cylinder 12 discharging the lubricant in the same through the bore 18, past the ball 22 and into the nipple 24 from which the lubricant is directed to the part to be lubricated. Due to the size of the cylinder 12 and piston 13 considerable pressure is exerted which is usually sufficient to force lubrication into a cavity in which former lubrication has hardened. However, when the resistance to the entry of lubricant into such cavity is exceedingly great the piston 13 becomes stalled and does not move throughout its entire stroke. In such case the plunger 28 would be in the position shown in Fig. 2. The catch 54 might then enter the groove 29 and engage the shoulder 31. Pressure on the lever 48 would then cause the plunger 28 to be further retracted and the spring 15 to be additionally compressed. Such compression of the spring 15 would cause the spring to exert a greater force on the piston 13 and to give the same additional drive for forcing the lubricant into the cavity. It will readily be comprehended that with this invention the plunger may be retracted in steps. With such an arrangement less force is required in compressing the spring and retracting the plunger when the passageway to the cavity to be lubricated is free. When considerable resistance is encountered in discharging the lubricant, a second operation of the device further compresses the spring and the required additional force is procured. Thus, the user only has to exert the additional effort required in retracting the piston when the passageway leading to the cavity is not open. Upon subsequent retraction of the piston 13 ball 22 seats against seat 21 and compels the drawing of lubricant from the chamber 37 through passageway 39 and into bore 12.

The advantages of the invention are manifest. The device is simple and easy to operate and does not require any degree of skill or ingenuity. If the lubricant is not delivered on the first application, the movement of the lever is repeated and the device automatically increases the pressure. The entire device can be constructed at a nominal expense and is simple in construction. The parts are so arranged that the grease gun is convenient to hold and manipulate and is adapted to be applied in close quarters.

Changes in the specific form of the invention, as herein described, may be made within the scope of what is claimed without departing from the spirit of the invention.

Having described the invention, what is claimed as new and desired to be protected by Letters Patent is:

1. In a grease gun, a body providing a cylinder for the reception of grease, a piston slidable in said cylinder, a guide in said body, a plunger connected to said piston and movable along said guide, a spring seat carried by said body a spring acting between said plunger and said spring seat and urging said plunger and piston in a direction to compress the grease in said cylinder, said plunger upon movement in the opposite direction retracting said piston in said cylinder, longitudinally spaced shoulders formed on said plunger and disposed transversely of the direction of movement of said plunger, a lever pivotally connected to said body and having a part movable substantially in the same direction as said plunger, an actuator movably connected to said lever at the denoted part thereof, a catch on said actuator, said actuator being spring biased to bring said catch into engagement with either of said shoulders, said lever when moved in one direction causing said actuator to move said plunger in a direction to retract said piston, and stressing said first named spring to a greater degree when the catch is in engagement with one shoulder than with the other and release means carried by said body and engaging said catch, for moving said catch laterally away from said plunger and out of engagement with the shoulder with which it cooperates when the actuator reaches a certain position in its piston retracting movement.

2. In a grease gun, a body providing a cylinder for the reception of grease, a piston slidable in said cylinder, a guide in said body, a plunger connected to said piston and movable along said guide, a spring seat carried by said body a spring acting between said plunger and said spring seat and urging said plunger and piston in a direction to compress the grease in said cylinder, said plunger upon movement in the opposite direction retracting said piston in said cylinder, longitudinally spaced shoulders formed on said plunger and disposed transversely of the direction of movement of said plunger, a lever pivotally connected to said body and having a part movable substantially in the same direction as said plunger, an actuator movably connected to said lever at the denoted part thereof, a catch on said actuator, said actuator being spring biased to bring said catch into engagement with either of said shoulders, said lever when moved in one direction causing said actuator to move said plunger in a direction to retract said piston, and stressing said first named spring to a greater degree when the catch is in engagement with one shoulder than with the other and release means including a cam and a cam follower in relative sliding engagement with one another, one thereof being disposed on said actuator and the other on said body, and movable relative to one another in the direction of movement of said actuator said cam having a surface oblique to the direction of travel of the actuator and causing lateral movement of the catch relative to the plunger and disengagement of the catch from the shoulder engaged thereby when the actuator reaches a certain position in its piston retracting movement.

3. In a grease gun, a body providing a cylinder for the reception of grease, a piston slidable in said cylinder, a guide in said body extending in the same direction as said cylinder, a plunger connection to said piston and movable along said guide, a spring seat carried by said body a spring acting between said plunger and said spring seat and urging said plunger and piston in a direction to compress the grease in said cylinder, said plunger upon movement in the opposite direction retracting said piston in said cylinder, longitudinally spaced shoulders formed on said plunger disposed transversely of the direction of movement of said plunger, a lever pivotally connected to said body and having a part movable substantially in the same direction as said plunger, an actuator pivoted to said lever at the denoted part thereof, a catch on said actuator adapted to engage either of said shoulders, a spring acting between said actuator and said lever and urging said catch into engagement with either of said shoulders, said lever when moved in one direction causing said actuator to move said plunger in a direction to retract said piston and stressing said first named spring to a greater degree when the catch is in engagement with one shoulder than with the other and release means including a cam and a cam follower in relative sliding engagement with one another, one thereof being disposed on said actuator and the other on said body, and movable relative to one another in the direction of movement of said actuator said cam having a surface oblique to the direction of travel of the actuator and causing lateral movement of the catch relative to the plunger and disengagement of the catch from the shoulder engaged thereby when the actuator reaches a certain position in its piston retracting movement.

4. In a grease gun, a body providing a cylinder for the reception of grease, a piston slidable in said cylinder, a guide in said body extending in the same direction as said cylinder, a plunger connected to said piston and movable along said guide, a spring seat carried by said body a spring acting between said plunger and said spring seat and urging said plunger and piston in a direction to compress the grease in said cylinder, said plunger upon movement in the opposite direction retracting said piston in said cylinder, longitudinally spaced shoulders formed on said plunger disposed transversely of the direction of movement of said plunger, a lever pivotally connected to said body and having a part movable substantially in the same direction as said plunger, an actuator pivoted to said lever at the denoted part thereof, a catch on said actuator adapted to engage either of said shoulders, a spring acting between said actuator and said lever and urging said catch into engagement with either of said shoulders, said lever when moved in one direction causing said actuator to move said plunger in a direction to retract said piston, and stressing said first named spring to a greater degree when the catch is in engagement with one shoulder than with the other and release means including a cam and a cam follower, in relative sliding engagement with one another, one thereof being disposed on said actuator near said catch and the other being disposed on said body near the end of said guide most remote from the cylinder and movable relative to one another in the direction of movement of said actuator, said cam having a surface oblique to the direction of travel of the actuator and causing lateral movement of the catch relative to the plunger and disengagement of the catch from the shoulder engaged thereby when the actuator reaches a certain position in its piston retracting movement.

References Cited in the file of this patent

UNITED STATES PATENTS

| Number | Name | Date |
| --- | --- | --- |
| 1,259,463 | De Fir | Mar. 12, 1918 |
| 1,976,903 | Tear | Oct. 16, 1934 |
| 2,151,676 | Appleby | Mar. 28, 1939 |
| 2,229,035 | Bijur | Jan. 21, 1941 |
| 2,435,647 | Engseth | Feb. 10, 1948 |